United States Patent [19]

Bauer et al.

[11] Patent Number: 5,981,766
[45] Date of Patent: Nov. 9, 1999

[54] PROCESS FOR THE PREPARATION OF 4,4'-DIMETHYL-6,6'-DICHLOROTHIOINDIGO

[75] Inventors: Wolfgang Bauer, 63477 Maintal; Uwe Baeumler, 60386 Frankfurt; Hans Kurz, Karben; Hans-Peter Kreutzer, Nidderau, all of Germany

[73] Assignee: Clariant GmbH, Frankfurt, Germany

[21] Appl. No.: 09/234,227

[22] Filed: Jan. 20, 1999

[30] Foreign Application Priority Data

Jan. 21, 1998 [DE] Germany ............................ 198 02 081

[51] Int. Cl.⁶ ...................... C07D 333/64; C07D 409/00
[52] U.S. Cl. ................................................. 549/56; 549/59
[58] Field of Search .......................................... 549/56, 59

[56] References Cited

U.S. PATENT DOCUMENTS 4,229,583  10/1980  Spietschka et al. ...................... 549/52
4,284,789  8/1981  Spietschka et al. ...................... 549/52

*Primary Examiner*—Johann Richter
*Assistant Examiner*—Joseph Murray
*Attorney, Agent, or Firm*—Susan S. Jackson

[57] ABSTRACT

4,4'-Dimethyl-6,6'-dichlorothioindigo is obtained in the stable crystal modification I, distinguished by the fraction angles (2 theta):

lines of high intensity: 25.99; 27.26
lines of moderate intensity: 10.27; 12.48; 22.39; 23.91; 24.82; 28.87,
by oxidizing 3-hydroxy-4-methyl-6-chlorothionaphthene having a mean particle size of at most 20 $\mu$m.

12 Claims, No Drawings

PROCESS FOR THE PREPARATION OF 4,4'-DIMETHYL-6,6'-DICHLOROTHIOINDIGO

CROSS-REFERENCES TO RELATED APPLICATIONS

The present invention is described in the German Priority Application No. 198 02 081.3, filed Jan. 21, 1998, which is hereby incorporated by reference as is fully disclosed herein.

The present invention relates to a process for the preparation of 4,4'-dimethyl-6,6'-dichlorothioindigo of the formula (I)

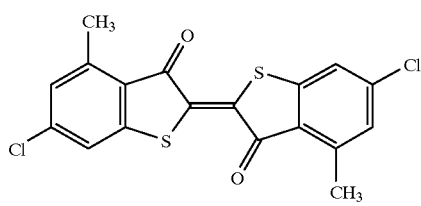

in a stable crystal modification (modification I) which, in the X-ray diffraction pattern (CuK$_\alpha$ radiation), has lines at the following diffraction angles 2 θ (°):

lines of high intensity: 25.99; 27.26 lines of moderate intensity: 10.27; 12.48; 22.39; 23.91; 24.82; 28.87.

DESCRIPTION OF THE RELATED ART

The stable crystal modification I of the pigment of the formula I is suitable for the surface coatings and plastics sector and in particular for cosmetic applications. Processes for the preparation of thioindigo derivatives, in particular 4,4'-dimethyl-6,6'-dichlorothioindigo (C.I. Pigment Red 181, D & C Red 30) and 4,4',7,7'-tetrachlorothioindigo (C.I. Pigment Red 88) have been known for decades.

These thioindigo derivatives are generally prepared by oxidation of correspondingly substituted 3-hydroxythionaphthene derivatives of the formula II (see, for example, W. Herbst and K. Hunger, Industrielle Organische Pigmente, VCH Weinheim, 1987, p. 487–492).

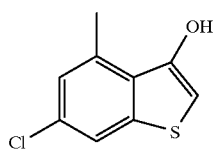

Suitable oxidizing agents are oxygen in the presence of transition metal catalysts (DE 3 117 055), iron(III) salts (DE 197 162, DE 194 237), chlorosulfonic acid (DE 241 910), alkaline metal peroxodisulfates or ammonium peroxodisulfates (DE 2 504 935), nitroarenesulfonic acid (EP 56 867) or disodium polysulfide (U.S. Pat. No. 2,158,032). As well as the cited preparation processes for the crude pigments, the following processes are, for example, known, according to which the resulting crude thioindigo compounds of the formula I are converted into a suitable pigment form:

by grinding with salt (DE 1 137 156), by reprecipitation from sulfuric acid or chlorosulfonic acid and subsequent treatment with organic solvents (DE 2 504 962), by grinding the crude pigment in the presence of bases (DE 2 043 820), by finishing with organic solvents such as nitrobenzene in the presence of surface-active substances (DE 3 324 879), by converting the crude pigment into the leuco compound in the presence of surfactants and subsequent reoxidation (DE 3 117 056, DE 2 916 400) and by applying shear forces during oxidation of the leuco compound in the presence of dithionite (EP-A-0 018 008).

A common feature of all of the cited processes is that, in addition to the synthesis of the thioindigo compound, other process steps are required to achieve the desired pigment properties. This leads to economic and ecological disadvantages as a result of losses in yield and contamination of wastewater or exhaust air, for example during the finishing with organic solvents such as nitrobenzene in the presence of surface-active substances (DE 3 324 879), during isolation of the leuco compound (DE 3 117 056) or as a result of the regeneration of organic solvents (DE 3 324 879).

The preparation of the pigment of the formula I by methods customary todate produces other technical and economical problems as a result of the fact that an unstable crystal modification II is produced in uncontrollable amounts, which, in the X-ray diffraction pattern (CuK$_\alpha$-radiation), displays lines at the following diffraction angles 2 θ (°):

lines of high intensity: 27.1 lines of moderate intensity: 10.99; 13.99; 18.60; 22.41; 24.33; 25.25; 28.06, 29.19.

The corresponding X-ray diffraction pattern is shown in FIG. 2.

If the pigment of the formula I forms in the unstable crystal modification II, it has a yellowish and undesired hazy color, which is unsuitable particularly in the cosmetics sector.

SUMMARY OF THE INVENTION

The object of the present invention was therefore to provide a process for the preparation of 4,4'-dimethyl-6,6'-dichlorothioindigo which avoids the disadvantages of the processes known todate and which can be used to prepare the thioindigo compound of the formula I in a direct manner in a readily dispersible, intensely colored and brilliant pigment form having the stable crystal modification I.

Surprisingly, it has been found that during the oxidation of 3-hydroxy-4-methyl-6-chlorothionaphthene of the formula II

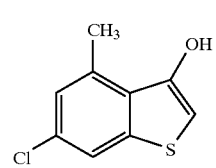

the thioindigo compound of the formula I is obtained as a readily dispersible, intensely colored and brilliant pigment having the stable crystal modification I if the compound of the formula II used has a mean particle size D$_{50}$ of at most 20 μm.

The invention thus provides a process for the preparation of 4,4'-dimethyl-6,6'-clichlorothioindigo of the formula (I)

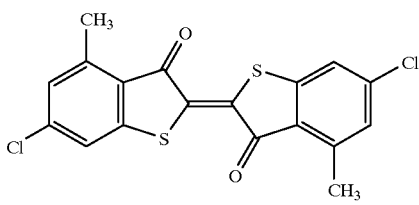

(I)

in the stable crystal modification I, which, in the X-ray diffraction pattern (CuK$_\alpha$-radiation), has lines at the following diffraction angles 2 θ (°):
  lines of high intensity: 25.99; 27.26
  lines of moderate intensity: 10.27; 12.48; 22.39; 23.91; 24.82; 28.87,
  wherein 3-hydroxy-4-methyl-6-chlorothionaphthene of the formula (II)

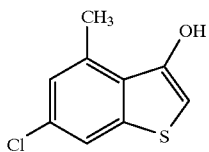

(II)

has a mean particle size D$_{50}$ of at most 20 μm and is oxidized using an oxidizing agent to give the pigment of the formula I.

DESCRIPTION OF THE PREFERRED EMBODIMENTS

The thionaphthene derivative of the formula II used preferably has a particle size of at most 15 μm. A lower limit for the particle size is not required for the purpose according to the invention. Particle sizes of 0,01 μm, for example, can be achieved in industry.

Examples of suitable oxidizing agents are: iron(III) salts, such as iron(III) chloride, iron(III) sulfate, hexacyanoferrate (III), nitro compounds, such as 3-nitrobenzenesulfonic acid, (atmospheric) oxygen, ozone, percarbonates, perborates, polysulfides, in particular alkali metal polysulfides, such as, for example, disodium polysulfide or dipotassium polysulfide.

The process according to the invention can be carried out in an organic solvent or solvent mixture. Examples of suitable solvents are alcohols, in particular methanol or ethanol, glycols, such as ethylene glycol, di- and polyglycols, such as, for example, diethylene glycol, triethylene glycol, glycol ethers, such as, for example, methyl glycol, butyl glycol, methyl diglycol, ethylene glycol dimethyl ether, urea derivatives, such as, for example, tetramethylurea, acid amides, such as, for example, dimethylformamide, N-methylpyrrolidone, or sulfoxides, such as, for example, dimethylsulfoxide, toluene or xylene.

An example of a solvent mixture which can be used is water mixed with one or more solvents which are partially or completely miscible with water.

Since, however, the process according to the invention also gives surprisingly excellent results in water, carrying out the process according to the invention in water without addition of organic solvents is particularly preferred in order to avoid the disadvantages associated with the use of organic solvents, for example solvent regeneration or wastewater aftertreatment.

The reaction according to the invention can be carried out at a temperature of from 30 to 150° C., preferably from 50 to 100° C.

The amount of oxidizing agent can be from 2 to 5, preferably from 2 to 3, oxidation equivalents per mole of compound of the formula (II).

The preparation of 3-hydroxy-4-methyl-6-chlorothioindigo of the formula II produces this compound with a particle size of up to 100 μm. A product having this particle size can be used to prepare the starting material, required for the process according to the invention, having particle sizes of at most 20 μm, preferably at most 15 μm, in a manner known per se by dry or wet particles comminution. Such comminution procedures can be carried out, for example, in suitable grinding or dispersing equipment known per se, for example sandmills, beadmills, Ultraturrax, Supraton or Cavitron devices or by using ultrasound. It is advantageous to carry out comminution in a liquid, in particular aqueous, medium, and to use the comminuted product in the form of this liquid, in particular aqueous, dispersion in the process according to the invention.

A very particularly preferred embodiment of the process according to the invention consists in the starting material of the formula (II) having a mean particle size of at most 15 μm and being oxidized in a purely aqueous reaction medium with disodium polysulfide in the presence of a surfactant or surfactant mixture.

Suitable surfactants are, for example, from the series of anionic and nonionic surfactants and are used, for example, in an amount of from 0.01 to 20% by weight, preferably from 0.1 to 10% by weight, based on the compound of the formula (II). The surfactant can be added before or after the comminution operation. An overview of suitable noniono-genic or anionic surfactants can be found, for example, in "Ullmann's Encyklopädie der Technischen Chemie", 4th edition, volume 10, pages 449 ff, and volume 22, pages 455 ff., or taken from E. H. Daruwalla in K. Venkataraman, "The Chemistry of Synthetic Dyes", Vol. VII, pages 86 to 92 (1994). Examples of anionic surfactants are: lignosulfonate, alkanesulfonates, olefinsulfonates, ester sulfonates, alkylarylsulfonates, alkylsulfates, ether sulfates, fatty alcohol sulfates and phenol sulfonic acid/formaldehyde condensates and naphthalene sulfonic acid/formaldehyde condensation products. Nonionic surfactants are particularly preferred, in particular those from the series consisting of alkylphenol polyglycol ethers and their condensation products with phenol and formaldehyde and also the ethoxylation products of fatty acids, fatty acid amides, fatty amines, fatty alcohols or alkylphenols.

Very particularly preferred nonionic surfactants are ethoxylation products of fatty alcohols, fatty acids, fatty acid amides, fatty amines, alkylphenols or polypropylene glycols, for example fatty alcohol polyglycol ethers (®Genapol O products, Genapol X products, Genapol C products, Genapol T products from Clariant AG); polypropylene glycol polyglycol ethers (Genapol PF products, Genapol PN 30, Genapol PL 120 from Clariant AG); nonylphenol polyglycol ethers (®Arkopal N products from Clariant AG); tributylphenol polyglycol ethers (®Sapogenat T products from Clariant AG); fatty amine polyglycol ethers (®Genamin C products, Genamin O products, Genamin S products, Genamin T products from Clariant AG).

The use of an aqueous dispersion of the starting material of the formula (II) having an average particle size of at most 20 μm, in particular at most 15 μm, which comprises a nonionogenic surfactant or two or more nonionogenic surfactants is a particularly preferred embodiment of the process according to the invention.

The compound of the formula (II) is known and can be prepared by the synthesis processes known for this class of compound (see, for example, K. Venkataraman, The Chemistry of Synthetic Dyes, Vol. II, Academic Press, New York, 1952, p. 1033/1034; W. Herbst and K. Hunger, Industrielle Organische Pigmente, VCH Weinheim, 1987, p. 487–492).

Compared with the processes for the preparation of 4,4'-dimethyl-6,6'-dichlorothioindigo which are already known, the process according to the invention has clear advantages by virtue of the fact that the stable crystal modification I in an intensively colored, brilliant pigment form can be prepared in a direct manner, and also in view of the fact that it is economical and environmentally friendly. The 4,4'-dimethyl-6,6'-dichlorothioindigo prepared according to the invention is suitable for the coloring of plastics, surface coatings and, in particular, cosmetics.

The X-ray diffraction pattern of the stable modification I, recorded using Cu $K_\alpha$ radiation is shown in FIG. 1, and that for the unstable crystal modification II in FIG. 2. The patterns were recorded using a computer-controlled Siemens D 500 powder diffractometer.

In the examples given below, the percentages are by weight.

Mixture 1: 3-hydroxy-4-methyl-6-chlorothionaphthene, Unground 49.7 g of 3-hydroxy-4-methyl-6-chlorothionaphthene are introduced into 750 g of demineralized water, and the mixture is stirred for 1 hour using a paddle stirrer without the application of shear forces.

Measurement of the particle size distribution by the Coulter-Counter method gives the following statistical parameters for the particle size distribution:

D25: 22.6 μm
D50: 23.0 μm
D75: 30.7 μm
D95: 42.3 μm
Dmax: 28.2 μm

Mixture 2: 3-hydroxy-4-methyl-6-chlorothionaphthene, Ground 49.7 g of 3-hydroxy-4-methyl-6-chlorothionaphthene are introduced into 750 g of demineralized water and ground using an Ultra-Turrax (T 25, idling speed: 20500/min from Janke & Kunkel) for 3 hours at 25° C.

Measurement of the particle size distribution by the Coulter-Counter method gives the following parameters for the particle size distribution:

D25: 7.7 μm
D50: 13.8 μm
D75: 16.6 μm
D95: 23.9 μm
Dmax: 13.7 μm

EXAMPLE 1

Preparation of 4,4'-dimethyl-6,6'-dichlorothioindigo from Mixture 2

The above described mixture 2 is admixed with 2.5 g of a fatty alcohol polyglycol ether (Genapol X 080) under a nitrogen atmosphere at 25° C., heated to 75° C. and, at 75° C. over the course of 4 hours with stirring, admixed with a mixture of 56.7 g of 43% strength disodium polysulfide and 31.7 g of 50% strength sodium hydroxide solution. In order to complete the oxidation reaction, the mixture is stirred for 4 hours at 75° C., and then 1.8 l of demineralized water are added, and the pigment suspension is filtered at 60° C. The resulting press cake is washed with 600 g of demineralized water until free from alkali and sulfide, and dried to constant weight at 80° C. under reduced pressure (200 torr).

Yield: 47.5 g (96.6% of the theoretical yield) of a brilliant red powder; Crystal modification: I (see FIG. 1)

EXAMPLE 2

Preparation of 4,4'-dichloro-6,6'-dichlorothioindigo from Mixture 2

The procedure of Example 1 is repeated, but adding 2.5 g of a fatty alcohol polyglycol ether (Genapol C 200) instead of 2.5 g of Genapol X080.

Yield: 47.3 g (96.2% of the theoretical yield) of a brilliant red powder; Crystal modification: I (see FIG. 1)

COMPARATIVE EXAMPLE A

Preparation of 4,4'-dimethyl-6,6'-dichlorothioindigo from Mixture 1

Mixture 1 (49.7 g of 3-hydroxy-4-methyl-6-chlorothionaphthene, unground, in 750 g of demineralized water) is converted into the pigment of the formula I following the instructions of Example 1 using a mixture of 56.7 g of disodium polysulfide and 31.7 g of 50% strength sodium hydroxide solution in the presence of 2.5 g of Genapol X080 at 75° C. Working up as given in Example 1 gives the pigment in the following yield and crystal modification:

Yield: 47.0 g (95.6% of the theoretical yield) of a red powder. Crystal modification: II (see FIG. 2)

COMPARATIVE EXAMPLE B

Preparation of 4,4'-dimethyl-6,6'-dichlorothioindigo from Mixture 1

The procedure is as in Comparative Example A, but using a mixture of 750 g of water and 75 g of ethanol instead of 750 g of water, and 5.0 g of an industrial resin soap (Resol 50) instead of 2.5 g of Genapol X080.

The pigment of the formula I is obtained in the following yield and crystal modification:

Yield: 47.1 g (95.8% of the theoretical yield) of a red powder; Crystal modification: II (see FIG. 2)

Performance Tests

The pigments obtained according to Examples 1 and 2 and Comparative Examples A and B are dispersed in boiled linseed oil, brightened using titanium dioxide in the ratio 1:10 and compared by colorimetry against a standard, established in the cosmetics sector, for D & C Red 30 in terms of coloring strength and shade. Table 1 summarizes the test results.

TABLE 1

| Pigment from | Crystal modification | Coloring strength | Shade/purity |
| --- | --- | --- | --- |
| Example 1 | I | 106% | A trace more blue/somewhat purer |
| Example 2 | I | 115% | comparable/somewhat purer |
| Comparative Example A | II | 85% | considerably more yellow/considerably more cloudy |

TABLE 1-continued

| Pigment from | Crystal modification | Coloring strength | Shade/purity |
|---|---|---|---|
| Comparative Example B | II | 90% | considerably more yellow/considerably more cloudy |

Table 2 gives further examples, which can be obtained according to the instructions of Example 1 according to the process of the invention from the mixture 2 obtained by grinding 3-hydroxy-4-methyl-6-chlorothionaphthene.

Table 2 also gives the color strengths of the pigment, measured after brightening with TiO$_2$ (ratio 1:10), against the standard D & C Red 30 chosen in Table 1, and also the shade obtained after brightening with TiO$_2$ (ratio 1:10) relative to the standard D & C Red 30 chosen in Table 1.

TABLE 2

| | Amount of surfactant per mole of | | Assessment relative to the Standard | |
|---|---|---|---|---|
| Ex. | 3-hydroxy-4-methyl-6-chlorothionaphthene | Solvent | Color strength | Shade/purity |
| 3 | 5.0 g Genapol X080 | Water | 105% | somewhat more blue/somewhat more pure |
| 4 | 20.0 g Genapol X080 | Water | 110% | somewhat more blue/somewhat more pure |
| 5 | 10.0 g ligninsulfonate | Water | 113% more cloudy | significantly more blue/somewhat more cloudy |
| 6 | 10.0 g Genapol O-080 | Water | 127% | a trace more blue/ significantly more pure |
| 7 | 10.0 g Genapol O-100 | Water | 109% | comparable/somewhat more pure |
| 8 | 10.0 g Genapol T110 | Water | 117% | somewhat more blue/somewhat more pure |
| 9 | 10.0 g Arkopal N 100 | Water | 115% | somewhat more blue/somewhat more cloudy |
| 10 | 10.0 g emulsifier WN liq. | Water | 114% | significantly more blue/a trace more cloudy |
| 11 | 10.0 g Humectol C high conc. | 90% Water/10% ethanol | 98% | somewhat more blue/somewhat more pure |
| 123 | 10.0 g Genamin C 100 | Water | 116% | somewhat more blue/comparable |

In all of the Examples 3 to 12 the crystal modification I according to the invention is obtained.

We claim:

1. A process for the preparation of 4,4'-dimethyl-6,6'-dichlorothioindigo of the formula (I)

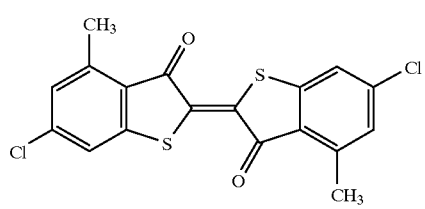

(I)

in the stable crystal modification I, which, in the X-ray diffraction pattern measured with CuK$_\alpha$-radiation, has lines at the following diffraction angles 2 θ (°):

lines of high intensity: 25.99; 27.26
lines of moderate intensity: 10.27; 12.48; 22.39; 23.91; 24.82; 28.87,
wherein 3-hydroxy-4-methyl-6-chlorothionaphthene of the formula (II)

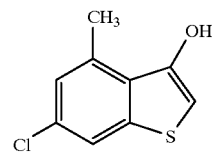

(II)

has a mean particle size D$_{50}$ of at most 20 μm and is oxidized using an oxidizing agent to give the pigment of the formula I.

2. The process as claimed in claim 1, wherein the compound of the formula (II) has a mean particle size D$_{50}$ of at most 15 μm.

3. The process as claimed in claim 1, wherein the oxidizing agent is an iron(III) salt, a nitro compound, oxygen, ozone, percarbonate, a perborate or a polysulfide.

4. The process as claimed in claim 1, wherein the oxidizing agent is an alkali metal polysulfide.

5. The process as claimed in claim 1, wherein the oxidizing agent is disodium polysulfide.

6. The process as claimed in claim 1, wherein the oxidation is carried out in the presence of a surfactant or a surfactant mixture.

7. The process as claimed in claim 6, wherein the surfactant is a nonionogenic surfactant.

8. The process as claimed in claim 7, wherein the nonionogenic surfactant is an ethoxylation product of a fatty amine, of a fatty amide, of a fatty alcohol, of a fatty acid, of an alkylphenol or of a polypropylene glycol.

9. The process as claimed in claim 1, wherein the oxidation is carried out at a temperature of from 30 to 150° C.

10. The process as claimed in claim 1, wherein the oxidation is carried out at a temperature of from 50 to 100° C.

11. The process as claimed in claim 1, wherein the oxidation is carried out in a mixture of water and one or more organic solvents which are partially or completely miscible with water.

12. The process as claimed in claim 1, wherein the oxidation is carried out in water.

* * * * *